Sept. 22, 1970 A. J. PERNESKI 3,530,446

MAGNETIC DOMAIN FANOUT CIRCUIT

Filed Sept. 12, 1968 2 Sheets-Sheet 1

INVENTOR
A. J. PERNESKI
BY Herbert M. Shapiro
ATTORNEY 3,530,446
MAGNETIC DOMAIN FANOUT CIRCUIT
Anthony J. Perneski, Martinsville, N.J., assignor to Bell Telephone Laboratories, Incorporated, Murray Hill and Berkeley Heights, N.J., a corporation of New York
Filed Sept. 12, 1968, Ser. No. 759,337
Int. Cl. G11c *11/14, 19/00*
U.S. Cl. 340—174 7 Claims

ABSTRACT OF THE DISCLOSURE

A single wall domain is advanced in a sheet of magnetic material by means of moving pole patterns in magnetically soft overlays contiguous the sheet. The domain can be made to move along a selected one of first and second intersecting propagation channels defined by those overlays respectively by first and second modifications in a rotating transverse field generating those patterns when the domain is in the intersection between the channels.

FIELD OF THE INVENTION

This invention relates to data processing arrangement and, more particularly, to such arrangements employing magnetic media in which single wall domains can be propagated.

BACKGROUND OF THE INVENTION

A single wall domain is a magnetic domain bounded by a domain wall which closes on itself and has a geometry independent of the boundary of the sheet in the plane in which it is moved. The domain conveniently assumes the shape of a circle (viz., cylinder) in the plane of the sheet and has a stable diameter determined by the material parameters. A bias field of a polarity to contract domins insures movement of domains as stable entities. The Bell System Technical Journal, volume XLVI, No. 8, October 1967, at pages 1901 et seq., describes the propagation of single wall domains in a propagation medium such as a sheet of a rare earth orthoferrite.

The movement of domains is accomplished normally by generating consecutively offset localized fields (actually field gradients) of a polarity to attract domains. In this manner, a domain follows the consecutive attracting fields from input to output positions in the sheet. A three-phase propagation operation provides the directionality along a selected propagation path in a manner consistent with the teaching of the prior art.

A propagation wiring pattern for generating those localied fields assumes a geometry dictated by the material in which the domains are moved. A typical material is a rare earth orthoferrite. These materials have preferred directions of magnetization substantially normal to the plane of the sheet. If we adopt the convention that a sheet is saturated magnetically in a negative direction along an axis normal to the plane of the sheet, the magnetization of a single wall domain is in the other or positive direction along that axis. A domain, in this context, may be represented as an encircled plus sign where the circle represents the single domain wall. The propagation wiring pattern is conveniently in the form of consecutively in the form of consecutively offset closed loops to correspond to the circular geometry of the domain.

The geometry of the propagation wiring pattern in turn, determines the packing density in a magnetic sheet in which single wall domains are moved. Current requirements for generating propagation fields dictate minimum cross-sectional areas for the propagation conductors. When next adjacent conductors are closely spaced, however, the thickness of the conductors cannot be made disproportionately large. Rather, as the thickness of the conductors is increased, the width increases thus reducing the spacing between conductors at the risk of causing short circuits therebetween. Consequently, the width of the conductors as well as the spacings between them are made relatively large to accommodate the desired current. Further, the loop configuration requires a minimum dimension along the axis of propagation dictated by the width of two conductors plus the opening encompased thereby for each domain position. Photoresist techniques permit depositions having geometries in the submil range with reproducible results. But the minimum domain position size, of course, is several times larger than that dimension because of the loop pattern. Also, not all domain positions can be occupied simultaneously because the three-phase propagation cycle which provides directionality along a propagation channel requires some unoccupied domain positions. Thus, as much as about 10 mils are allocated for each bit location. Yet domains in the submicron size have been observed. A relatively high packing density could be realized if the requirement of discrete propagation conductors were eliminated.

But it is difficult to achieve selectivity in domain movement and the realization of logic operations with domains in the absence of discrete propagation conductors. Copending application Ser. No. 657,877, filed Aug. 2, 1967, for A. H. Bobeck, H. E. D. Scovil and W. Shockley, for example, describes a number of logic operations employing single wall domains. The operations employ discrete propagation conductors for effecting domain motion on a selective basis and turn to account interactions between neighboring domains.

An object of the present invention is to provide a single wall domain propagation device in which logic operations can be achieved in the absence of discrete propagation conductors.

Copending application Ser. No. 732,705, filed May 28, 1968 for A. H. Bobeck describes domain propagation in a sheet of magnetic material. Propagation is effected by means of attracting magnetic pole patterns moving along magnetically soft overlays responsive to a magnetic field rotating in the plane of the sheet. These (transverse) rotating fields are transverse to the direction of magnetization in the sheet and have only negligible direct effect on domains in the sheet.

BRIEF DESCRIPTION OF THE INVENTION

It has been found that domain propagation as described in the last-mentioned copending application of Bobeck can be realized with rotating transverse fields having amplitudes which vary over a considerable range. It has been found, in addition, that a domain moving along a chanel into an intersection from which there are two exit channels can be made to select an exit channel as a function of the amplitude of the rotating transverse field when the domain is in the intersection. In one embodiment, first and second exit channels are oriented at ±45 degrees respectively with respect to an entrance channel at an intersection. If the amplitude of the rotating transverse field is increased when the field is oriented at about +45 degrees, a domain follows the exit channel oriented at +45 degrees. If, on the other hand, the amplitude of the transverse field is increased when the field is oriented at about 135 degrees, a domain follows the exit channel oriented at −45 degrees.

DETAILED DESCRIPTION

Figure 1:
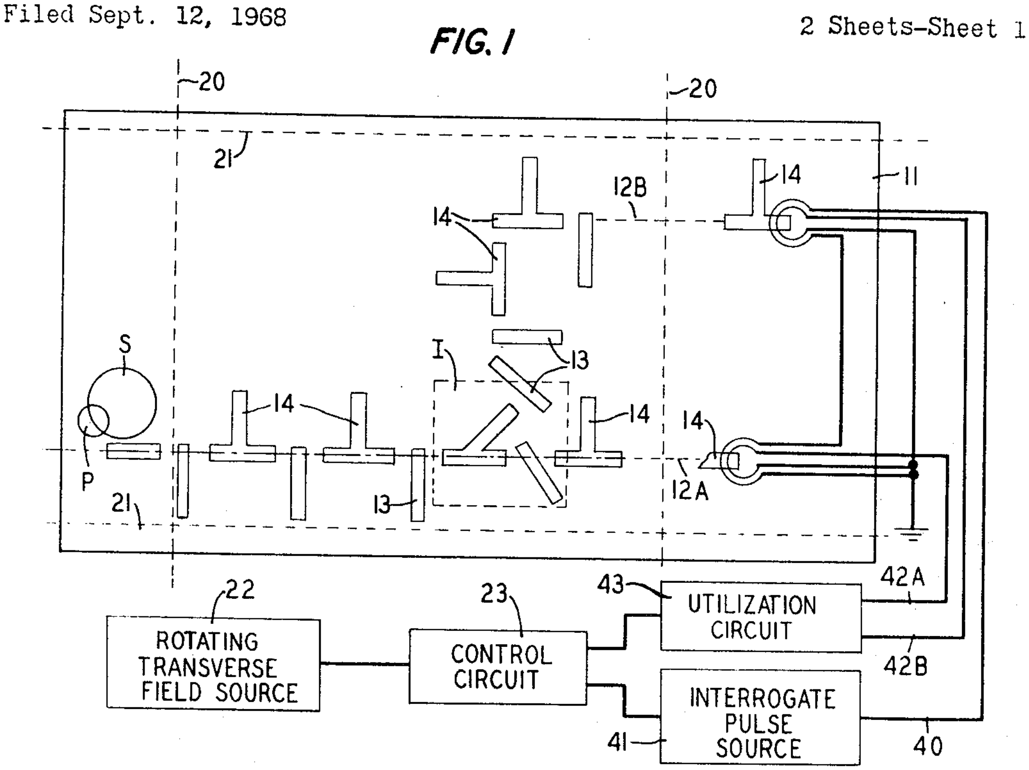
FIG. 1 is a schematic representation of a domain propagation arrangement in accordance with this invention.

FIG. 1 shows a domain propagation arrangement in accordance with this invention. The arrangement includes a sheet 11 in which single wall domains can be moved. First and second domain propagation channels 12A and 12B are defined in sheet 11 by bar and T-shaped magnetically soft overlays 13 and 14 respectively. An illustrative intersection I, indicated by a broken block so designated, is defined by a modification in the bar and T configuration where the two channels meet, as is discussed further hereinafter.

A domain is introduced into channel 12A, illustratively, from a source S comprising a magnetically soft permalloy disk. A domain P is permanently associated with the disk. In response to a rotating transverse field, domain P follows attracting poles about both the periphery of the disk and along channel 12A, simultaneously, until it divides into two thus providing one domain for propagation, one for further rotation about the periphery of the disk. Domain sources of this type are disclosed in detail in my copending application Ser. No. 756,210, filed Aug. 29, 1968.

Figure 2:
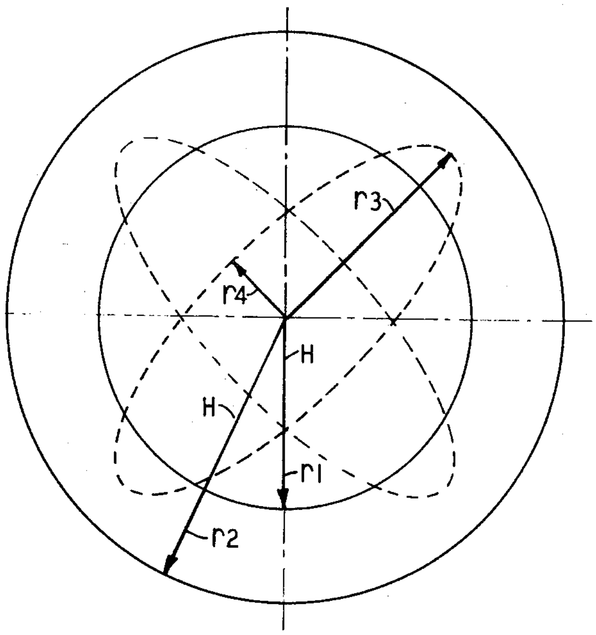
FIG. 2 is a schematic representation of the orientations and amplitudes of a rotating magnetic field for effecting the magnetic condition of the arrangement of FIG. 1.

A domain propagates along a channel following attracting pole concentrations which are moved along the overlays in response to the rotating magnetic field. There are upper and lower (practical) limits to the amplitude of the field for achieving domain movement. FIG. 2 shows two arrows, each labeled H but one generating a circle with radius *r*1 when rotated, the other generating a larger circle with radius *r*2. Each arrow represents a rotating transverse field but of minimum and of maximum amplitude respectively. The fact that a circle is generated when an arrow is rotated indicates that the field amplitude is constant.

The rotating field is supplied conveniently by two orthogonal pairs of coils oriented along lines 20 and 21 of FIG. 1 in a manner to provide a uniform field in sheet 11 when driven. The coils along with a suitable driver are represented by a block 22 designated "rotating transverse field source" in FIG. 1 and are under the control of a control circuit 23.

Figure 3:
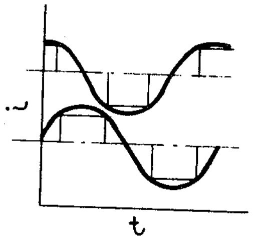
FIGS. 3 and 4 are representations of alternative signals for generating the fields of FIG. 2.

The field may be generated by pulse techniques as well as with sine-wave signals in accordance with well understood principles. The pulses and the corresponding sine-wave configurations for essentially constant field amplitudes are shown in FIG. 3. The field is generated, for example, by current signals applied to the pairs of coils by two sine-wave generators 90 degrees out of phase with one another.

Figure 4:
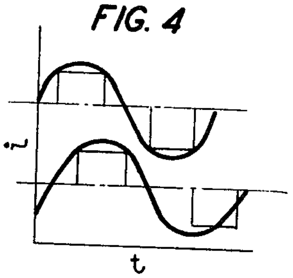

If, on the other hand, the sine waves are not 90 degrees out of phase but 90±45 degrees out of phase, for example, the rotating field varies in amplitude as indicated by the broken ellipses the major axes of which are inclined at ±45 degrees in FIG. 2. The pulse and sine-wave configurations for controllably varying field amplitudes are shown in FIG. 4. It is noted that only the first two pulses in FIG. 4 overlap one another thus indicating a resulting field of appropriately increased amplitude at only a +45 degree orientation.

Domain propagation continues uninterrupted in response to rotating fields of varying amplitude so long as those amplitudes are within the maximum and minimum limits for propagation. But controlled increases in the amplitudes over a portion of a single rotation of the field enable selection of an exit channel at intersection I of FIG. 1 between channels 12A and 12B while propagation continues. We will now discuss in detail the selection of each exit channel by such controlled increases.

Figure 5:
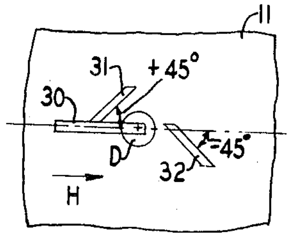
FIGS. 5 through 13 are fragmentary views of portions of the arrangement of FIG. 1 showing the magnetic condition thereof in response to fields at various orientations and amplitudes.

FIGS. 5 through 13 show the magnetic configuration of sheet 11 at intersection I for various orientations of the rotating field H. The field is represented by an arrow, similarly designated, showing the orientation of the field in each figure. In FIG. 5, the field is oriented along a horizontal axis to the right as viewed and has an amplitude, typically, of about 10 oersteds. The pertinent overlays at the intersection are designated 30, 31, and 32; 30 being oriented along the horizontal axis and 31 and 32 being oriented at ±45 degrees for the illustrative operation, respectively. When the field is oriented as shown in FIG. 5, positive poles concentrate at the right extreme of overlay 30, as indicated by the plus sign there, attracting domain D to that position.

Figure 6:
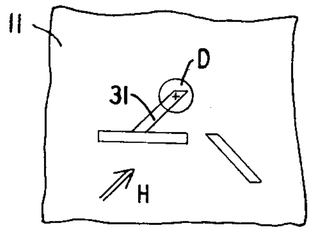
Figure 7:
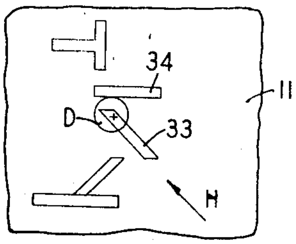
Figure 8:
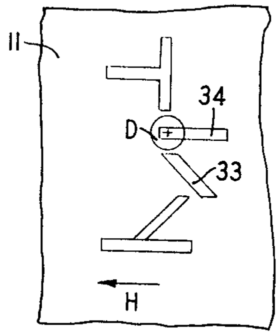
Figure 9:
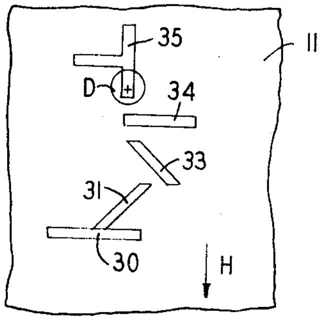

FIG. 6 shows an amplitude augmented field H as a heavy arrow aligned with overlay 31. A typical augmented field is 13 oersteds. A strong pole concentration accumulates at the top of that overlay thus attracting domain D to the position shown there. In FIG. 7, the field is oriented upward and to the left, aligned with overlay 33. In response, domain D moves to the position of the resulting attracting positive poles. In FIG. 8, the field is further rotated as indicated by the arrow directed to the left in the figure. The domain moves to the attracting pole concentration at the left extreme of overlay 34 aligned with the field. In FIG. 9, the field is directed downward and the domain D advances to the bottom of T-shaped overlay 35 as shown.

Figure 10:
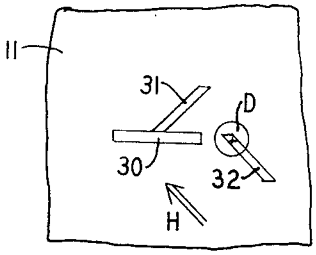

Consider a domain again in the position shown in FIG. 5 under the influence of a counterclockwise rotating transverse field. The field is initially directed to the right as viewed in FIG. 5. FIG. 10 shows the field rotated upward to the left to a position aligned with overlay 32. Also, as indicated by the heavy arrow in the figure, a field of increased amplitude is generated. Overlay 32 in response generates strong pole concentrations at its top thus attracting domain D to that position as shown in FIG. 10.

Figure 11:
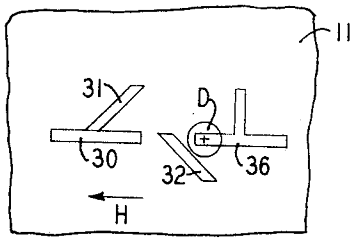
Figure 12:
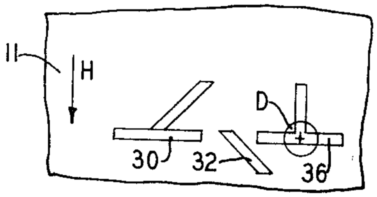
Figure 13:
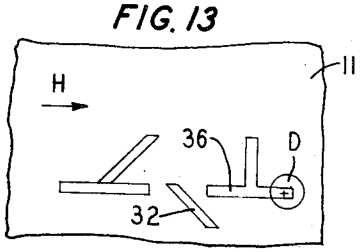

FIG. 11 shows the field H further rotated counterclockwise to a position aligned with hte bottom section of upside down T-shaped overlay 36. Attracting poles concentrate at the left end of overlay 36 and domain D moves to that position. In FIGS. 12 and 13, the pole concentrations move respectively to the middle and to the right end of overlay 36 as field H rotates through a downward orientation and to the right as viewed.

A comparison of FIGS. 9 and 12 with FIG. 5 indicates that a selection of an exit path for domain D at intersection I in response to a rotating field depends on the amplitude of that field when it is aligned with the first overlay of the selected path as shown in FIGS. 6 and 10. Domains so routed advance further in the selected channels in response to further rotations of the transverse field until associated terminal positions are reached.

An interrogate conductor 40 of FIG. 1 loops about a terminal position of each of channels 12A and 12B. Conductor 40 is connected between an interrogate pulse source 41 and ground. A separate conductor (viz., 42A, 42B . . .) loops the terminal position of a correspondingly designated channel and is connected between a utilization circuit 43 and ground. Each time the transverse field makes a complete rotation, source 41 applies a pulse to conductor 40 for collapsing any domains in terminal positions. If a domain is present, the corresponding conductor 42A, 42B . . ., applies a pulse to utilization circuit 43. Utilization circuit 43 and source 41 are connected to control circuit 23 for synchronization and activation.

The various sources and circuits may be any such elements capable of operating in accordance with this invention.

The provision of augmented channel select transverse fields by a change in the phase relationship between the two sine-wave signals which normally provide the propagation field has the advantage that it simultaneously reduces the field and thus the resulting pole strength in permalloy bars oriented perpendicular to the direction of the augmented field. This is clear from a glance at FIG. 2 where the field along the magor axis of an ellipse is represented by arrow $r3>r1$ and the field along the minor axis is represented by an arrow $r4<r1$ where $r1$, we will recall, is the minimum field for propagation. From analytical geometry, $r3$ is 1.31 times $r1$ whereas $r4$ is 0.565 times $r1$.

The advantage of a simultaneous reduction in the field at a nonselected channel is that operating margins are enhanced. The transverse progation fields are generated everywhere in sheet 11. Consequently, poles are generated in all bars and T-shaped overlays aligned or nearly aligned with the field. The pole strength is greatest when the overlays are exactly aligned with the field and least when the overlay is perpendicular to the field. Therefore, bars 31 and 32 of FIG. 5, for example, are perpendicular to one another to reduce the pole strength of one while the pole strength of the other is augmented to insure a proper selection. The bars at the intersection need not be so oriented nor is the field even necessarily augmented in order to insure selection of the lower channel as shown, for example, in FIG. 1. An augmented field at a +45 degree orientation in this instance insures that a domain D advances to the position in the upper channel as shown in FIG. 6. The position occupied by a domain in FIG. 10, on the other hand, is reached in due course in the absence of the augmented field for selecting the upper channel.

We have now shown how single wall domains can be routed to a first or second channel at an intersection thus permitting switching and other familiar logic functions. It should be understood further that the paths can adjoin the intersection at any angle (illustratively ±45 degrees) and that more than two paths can adjoin the intersection each selected by a transverse field of augmented amplitude and in a proper orientation.

A logic tree can be organized in accordance with this invention by having each of channels 12A and 12B again fan out into two exit channels for providing one-out-of-four outputs.

What has been described is considered only illustrative of the principles of this invention. Accordingly, various embodiments thereof can be devised by those skilled in the art without departing from the spirit and scope of this invention.

What is claimed is:

1. A domain propagation arrangement including a sheet of magnetic material in which a single wall domain having a first magnetization direction can be moved, means for generating in said sheet a reorienting filed in said sheet transverse to said first direction, overlay means responsive to said reorienting transverse field for moving said domain along a first of first, second, and third channels toward an intersection therebetween, means for effecting first and second modifications of said transverse field when said domain is in said intersection in a manner to cause said domain to enter said second or third channel respectively, means for introducing domains into said first channel, and means for detecting the presence and absence of domains in said second and third channels.

2. An arrangement in accordance with claim 1 wherein said means for defining comprises an overlay of magneticlly soft material in which moving pole concentrations are generated in response to said rotating field.

3. An arrangement in accordance with claim 2 wherein said overlay comprises bars and T-shaped permalloy patterns.

4. An arrangement in accordance with claim 3 wherein said intersection includes first and second spaced apart permalloy bars and T-shapes having at least portions aligned with respect to said first channel at first and second complementary angles.

5. An arrangement in accordance with claim 4 wherein said first and second angles are ±45 degrees.

6. An arrangement in accordance with claim 4 wherein said means for effecting first and second modifications comprises means for increasing the amplitude of said field when that field is aligned with respect to said axis at said first or second angles.

7. An arrangement in accordance with claim 6 wherein said means for generating said field comprises means for generating first and second sine-wave signals 90 degrees out of phase with one another and said means for effecting first and second modifications comprises means for changing the phase relationship between said first and second sine-wave signals.

References Cited

UNITED STATES PATENTS

| | | | |
|---|---|---|---|
| 3,454,939 | 7/1969 | Michaelis. | |
| 3,460,116 | 8/1969 | Bobeck et al. | |
| 3,438,006 | 4/1969 | Spain | 340—174 |

JAMES W. MOFFITT, Primary Examiner